US009513756B1

(12) United States Patent
Mishra et al.

(10) Patent No.: US 9,513,756 B1
(45) Date of Patent: Dec. 6, 2016

(54) PROVIDING NEAR FIELD COMMUNICATION THROUGH A TOUCH SCREEN

(71) Applicant: Clover Network, Inc., Mountain View, CA (US)

(72) Inventors: Abhinayak Mishra, Cupertino, CA (US); Victor Pan, Fremont, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 14/839,600

(22) Filed: Aug. 28, 2015

(51) Int. Cl.
*G06F 3/041* (2006.01)
*G06F 3/044* (2006.01)
*H04B 5/00* (2006.01)

(52) U.S. Cl.
CPC ............. *G06F 3/044* (2013.01); *G06F 3/0416* (2013.01); *H04B 5/0081* (2013.01)

(58) Field of Classification Search
CPC ...... G06F 3/044; G06F 3/0412; G06F 3/0416; G06F 3/0418; G06F 3/046; G06F 2203/04107; G06F 2203/04103; G06F 2203/0384; H01Q 1/242; H01Q 1/243; H01Q 1/2283; H01Q 7/00; H04B 5/00; H04B 5/0012; H04B 5/0025; H04B 5/0062; H04B 5/0081; H04B 15/00; H04B 15/005; H04B 15/02; H05K 2201/10098; H04M 2250/04; Y10T 29/49018; G06K 19/0779; G06K 19/07783
USPC ......... 345/173, 174, 178; 455/41.1; 343/720
See application file for complete search history.

(56) References Cited

U.S. PATENT DOCUMENTS

| 7,973,722 B1 | 7/2011 | Hill et al. |
| 8,988,305 B1 | 3/2015 | Eray |
| 9,058,079 B1 | 6/2015 | Schneider et al. |
| 2004/0082361 A1* | 4/2004 | Rajagopalan ......... G06F 1/1626 455/556.1 |
| 2009/0167699 A1 | 7/2009 | Rosenblatt et al. |
| 2010/0220062 A1* | 9/2010 | Antila .................. G06F 3/0488 345/173 |
| 2010/0315389 A1 | 12/2010 | Sorrell et al. |
| 2010/0321325 A1 | 12/2010 | Springer et al. |
| 2011/0111719 A1 | 5/2011 | Man et al. |

(Continued)

OTHER PUBLICATIONS

Agilent Application Note 1368-1, "Solutions for Measuring Permittivity and Permeability with LCR Meters and Impedance Analyzers," 5980-2862EN, Agilent Technologies, USA, May 28, 2014.

*Primary Examiner* — Amr Awad
*Assistant Examiner* — Roberto Flores
(74) *Attorney, Agent, or Firm* — The Mueller Law Office, P.C.

(57) ABSTRACT

Embodiments of the present invention enable near field communication (NFC) through a touch display. Some embodiments include specialized touch displays with lower electromagnetic dissipation factors than standard touch displays. Some embodiments include methods and devices for detecting the activation or deactivation of NFC communication using the touch display and adapting the touch display to that activation or deactivation. Disclosed techniques for adapting the touch display include optimizing the behavior of the touch display for operation in the face of electromagnetic interference when NFC is activated and conducting a partial recalibration of the touch display when NFC is deactivated.

13 Claims, 9 Drawing Sheets

(56) References Cited

U.S. PATENT DOCUMENTS

| | | | |
|---|---|---|---|
| 2012/0162128 A1* | 6/2012 | Hyoung | G06F 3/044 345/174 |
| 2012/0299863 A1 | 11/2012 | Yilmaz | |
| 2013/0009895 A1 | 1/2013 | Paulsen | |
| 2013/0059532 A1* | 3/2013 | Mahanfar | H04B 5/0031 455/41.1 |
| 2013/0076585 A1 | 3/2013 | Kim | |
| 2013/0090073 A1 | 4/2013 | Zhu et al. | |
| 2013/0162594 A1 | 6/2013 | Paulsen et al. | |
| 2013/0176252 A1 | 7/2013 | Fröjdh | |
| 2013/0181937 A1* | 7/2013 | Chen | G06F 3/044 345/174 |
| 2013/0196596 A1 | 8/2013 | Parekh et al. | |
| 2013/0229362 A1 | 9/2013 | Liu et al. | |
| 2013/0231046 A1* | 9/2013 | Pope | G06K 9/00013 455/41.1 |
| 2013/0241864 A1 | 9/2013 | Chen et al. | |
| 2013/0278480 A1* | 10/2013 | McMilin | H01Q 1/243 343/904 |
| 2014/0035378 A1 | 2/2014 | Kesler et al. | |
| 2014/0043248 A1 | 2/2014 | Yeh et al. | |
| 2014/0078090 A1 | 3/2014 | Fröjdh | |
| 2014/0078094 A1* | 3/2014 | Yang | G06F 3/0418 345/174 |
| 2014/0080411 A1 | 3/2014 | Konanur | |
| 2014/0086441 A1* | 3/2014 | Zhu | H01Q 1/243 381/332 |
| 2014/0141835 A1 | 5/2014 | Zhu et al. | |
| 2014/0146004 A1* | 5/2014 | Jang | G06F 1/1698 345/174 |
| 2014/0152425 A1 | 6/2014 | Valentine et al. | |
| 2014/0187153 A1 | 7/2014 | Zhu et al. | |
| 2014/0199944 A1 | 7/2014 | Ran et al. | |
| 2014/0213178 A1* | 7/2014 | Wolff | H01P 11/00 455/41.1 |
| 2014/0292359 A1* | 10/2014 | Akagi | G06F 3/044 324/705 |
| 2014/0340347 A1* | 11/2014 | Tenuta | G06F 3/0416 345/174 |
| 2015/0062448 A1* | 3/2015 | S. | G06F 1/169 349/12 |
| 2015/0062853 A1 | 3/2015 | Li et al. | |
| 2015/0091859 A1* | 4/2015 | Rosenberg | G06F 3/044 345/174 |
| 2015/0109167 A1* | 4/2015 | Yarga | H01Q 1/243 343/700 MS |
| 2015/0214619 A1* | 7/2015 | Shimizu | H01Q 1/243 343/748 |
| 2015/0249485 A1* | 9/2015 | Ouyang | H04B 5/0081 455/41.1 |
| 2015/0255856 A1* | 9/2015 | Hong | H01Q 9/0407 343/702 |
| 2015/0311960 A1* | 10/2015 | Samardzija | G06F 1/163 455/90.3 |
| 2016/0056526 A1* | 2/2016 | Li | H01Q 1/243 343/702 |
| 2016/0093939 A1* | 3/2016 | Kim | H01Q 1/243 343/720 |
| 2016/0188092 A1* | 6/2016 | Sebastian | G06F 3/0416 345/174 |

* cited by examiner

PROVIDING NEAR FIELD COMMUNICATION THROUGH A TOUCH SCREEN

BACKGROUND OF THE INVENTION

Near field communication (NFC) involves short range communication using magnetic induction between two loop antennas. Magnetic induction is a relationship between an electromotive force and a time varying magnetic field. By varying the magnetic field of one loop antenna, an electric current can be induced in the other antenna. In this sense, the combination of the two loop antennas can be conceptualized as an air-core transformer where the magnetic induction between the two windings of the transformer allows two devices to be communicatively coupled without being in physical contact.

One advantage of NFC is that only one of the devices involved in an NFC session needs to be a powered device, and the other can be a passive card, tag, or sticker. As a powered NFC device provides a signal to a passive device, the current that is induced in the passive device also provides power to that device. As a result, NFC has wide ranging applications in advertising (e.g., a consumer held reader communicating with a passive poster or sticker), ticketing (e.g., a ticket kiosk reader communicating with a passive ticket), and payments (e.g., a point of sale (POS) reader communicating with a passive smart card). Adoption of NFC by certain payment processing consortia has increased its potential for widespread adoption and has contributed to the inclusion of NFC technology in many smart phones and other devices.

The potential inclusion of NFC technology in a smart phone, tablet, POS, or other device has created an interesting design challenge. These devices often include other functionality such as radio antennas for longer distance wireless communication, touch displays, gyroscopes, and accelerometers that are packed into sleek and compact form factors. This additional functionality can interfere with the NFC communication pathway. For example, the touch screen, with its display and touch stack, serves as a barrier for NFC communication. Prior solutions have included placing the NFC antenna outside the lateral scope of the display in order to communicate around the display. A specific example of these kinds of approaches can be described with reference to device 100 in FIG. 1.

Figure 1:
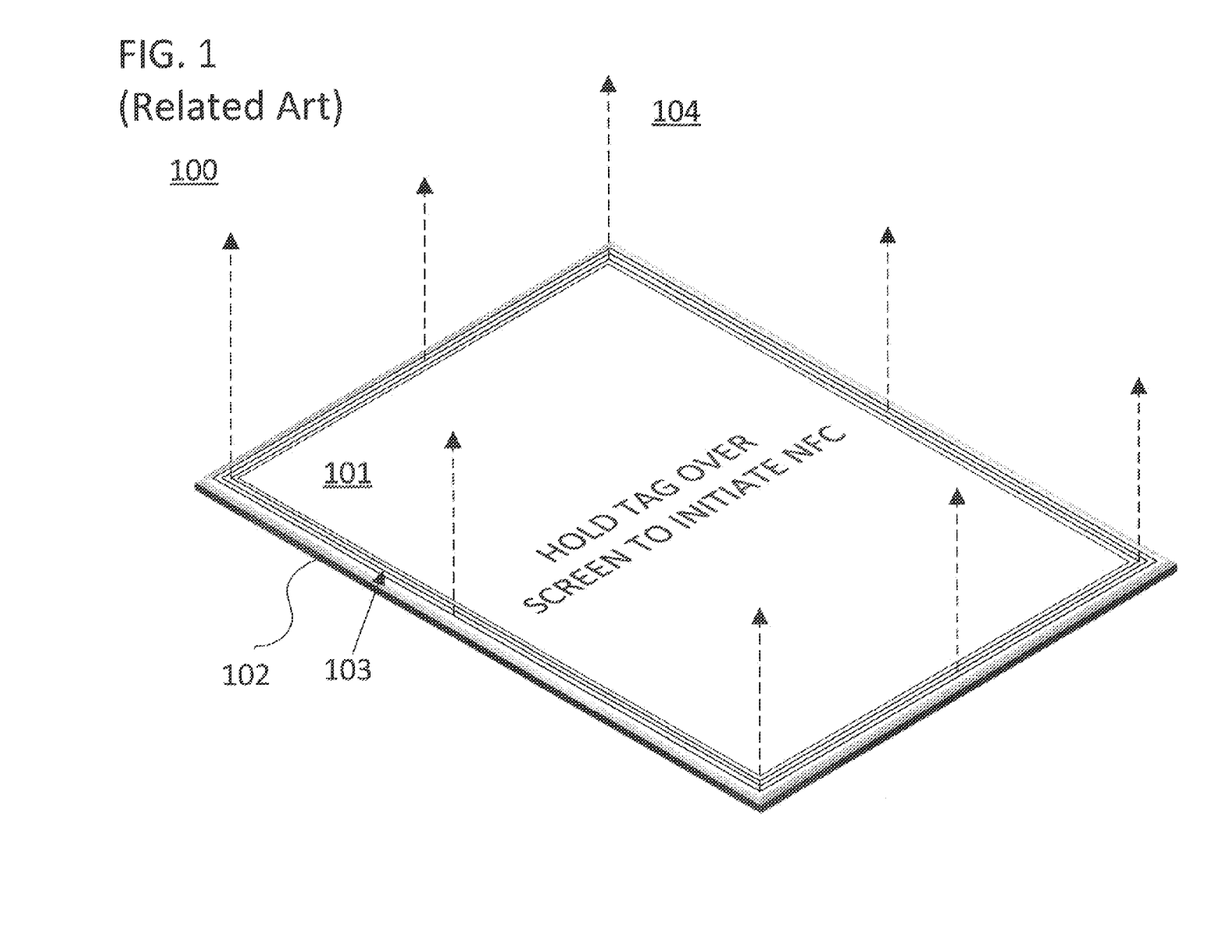
FIG. 1 illustrates an NFC device with a display wherein the NFC antenna is outside the lateral extent of the display in accordance with the related art.

Device 100 includes a display 101 in a device frame 102. Device 100 provides an example of placing the NFC antenna outside the lateral scope of the display because frame 102 includes an embedded inductive near field communication antenna 103 with a coil pattern that extends around the entire lateral extent of display 101. Note that the coils of antenna 103 are shown in the drawing for illustrative purposes, but would be covered by a thin layer of protective frame material in actual use. As a result of this configuration, device 100 is able to create an electromagnetic field in direction 104 rising from frame 102 in order for device 100 to communicate with another NFC device without display 101 interfering with that communication pathway.

SUMMARY OF INVENTION

In one embodiment, a device is provided. The device comprises a transparent cover layer with an exposed surface. The device also comprises a touch stack covered by the transparent layer, wherein the touch stack includes an array of capacitive touch detection points and a transparent dielectric. The device also comprises a display with a diagonal dimension in excess of five inches, and covered by the touch stack. The device also comprises an NFC antenna covered by the display and located entirely within the lateral extent of the display. There are no solid planes of conductive material that span the diagonal dimension and are located between the NFC antenna and the transparent cover layer. There is no ground plane in the touch stack.

In another embodiment, a method is provided. The method comprises reading a stream of touch values from a capacitive touch screen using a touch controller. The method also comprises a comparator instantiated in the touch controller to compare a current baseline of the array of capacitive touch detection points to a trigger level. The trigger level is stored in the touch controller and is higher than a noise floor baseline of the array of capacitive touch detection points when the NFC antenna is not activated.

In another embodiment, another method is provided. The method comprises determining that a near field communication antenna has been activated. The method also comprises storing a set of prior calibration values in a memory when the near field communication antenna is activated. The method also comprises reading a set of current calibration values using a processor of a touch screen controller from the memory before a near field communication antenna has been deactivated. The method also comprises determining that a near field communication antenna has been deactivated. The method also comprises reading the set of prior calibration values from the memory after detecting that the near field communication antenna has been deactivated.

In another embodiment, a system is provided. The system comprises an internal NFC antenna. The system also comprises a capacitive touch display having a diagonal dimension of at least 5 inches and entirely covering the internal NFC antenna. The system also comprises a transparent cover layer covering the capacitive touch screen and having an exposed surface. The system also comprises an external NFC antenna in operative communication with the internal NFC antenna through a capacitive touch display.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

The following detailed description discloses various approaches for providing near field communication (NFC) through a touch display via the use of particular devices, systems, and methods. Enabling NFC through a touch display is particularly difficult because the NFC antenna can interfere with the behavior of the touch display and the touch display can in turn interfere with the NFC antenna. Capacitive touch displays, in particular, are sensitive to NFC because the same magnetic coupling that produces an electromotive force in the targeted antenna also disturbs charge in the capacitive cells that are used to detect touch inputs. In turn, NFC antennas are impeded by touch displays because conductive planes in the display act as a shield for electromagnetic fields. Therefore, placing a touch display between the two antennas that are involved in a communication session serves to block the communication path between the two devices. Approaches are described below that address this problem from both directions. Some of the disclosed approaches make the touch display less sensitive to NFC interference, while others make the touch display less of an impediment to the antenna.

Some of the approaches described below involve modifications to a touch display to facilitate NFC via a communication pathway that passes through the touch display. In some approaches, there are no solid planes of conductive material that span the diagonal dimension of the display and intersect that communication pathway. Specific modifications to a device to facilitate NFC through a display are described below with reference to FIGS. 2-4. Some other approaches described below involve the dynamic detection of the state of the NFC antenna using a measurement from the touch display. Specific methods and devices for dynamically detecting the state of the NFC antenna are described below with reference to FIGS. 3 and 5-6. In some disclosed approaches, the touch screen is placed in alternative modes when the NFC antenna is activated and deactivated. In some disclosed approaches, a touch controller undergoes a partial recalibration when an NFC antenna transfers from an activated to a deactivated state. Specific methods and devices for altering the mode of the touch screen and recalibrating the touch controller are described below with reference to FIGS. 7-9.

Touch Screen Characteristics and Modifications

Specific touch screens and touch controllers that facilitate the transmission of NFC through the touch screen itself are described below with reference to FIGS. 2-4. In contrast to the device of FIG. 1, NFC in these approaches is conducted directly through the display of the device. The devices described below can include touch screens with diagonal dimensions in excess of 5 inches. This is again in contrast to the device of FIG. 1 because if the diagonal dimension of screen 101 were to be increased beyond 5 inches, it would not be commercially practicable to utilize an antenna with the configuration of 103 to conduct NFC communication. At that size, any commercially practicable implementation of the antenna would not be able to reliably induce the proper degree of electromotive force in an alternative device to which device 100 was attempting to communicate. However, if instead NFC communication is conducted directly through the display of the device, there is no accompanying limitation as to the diagonal dimension of the display because the length of the antenna and the size of the screen have been decoupled.

Figure 2:
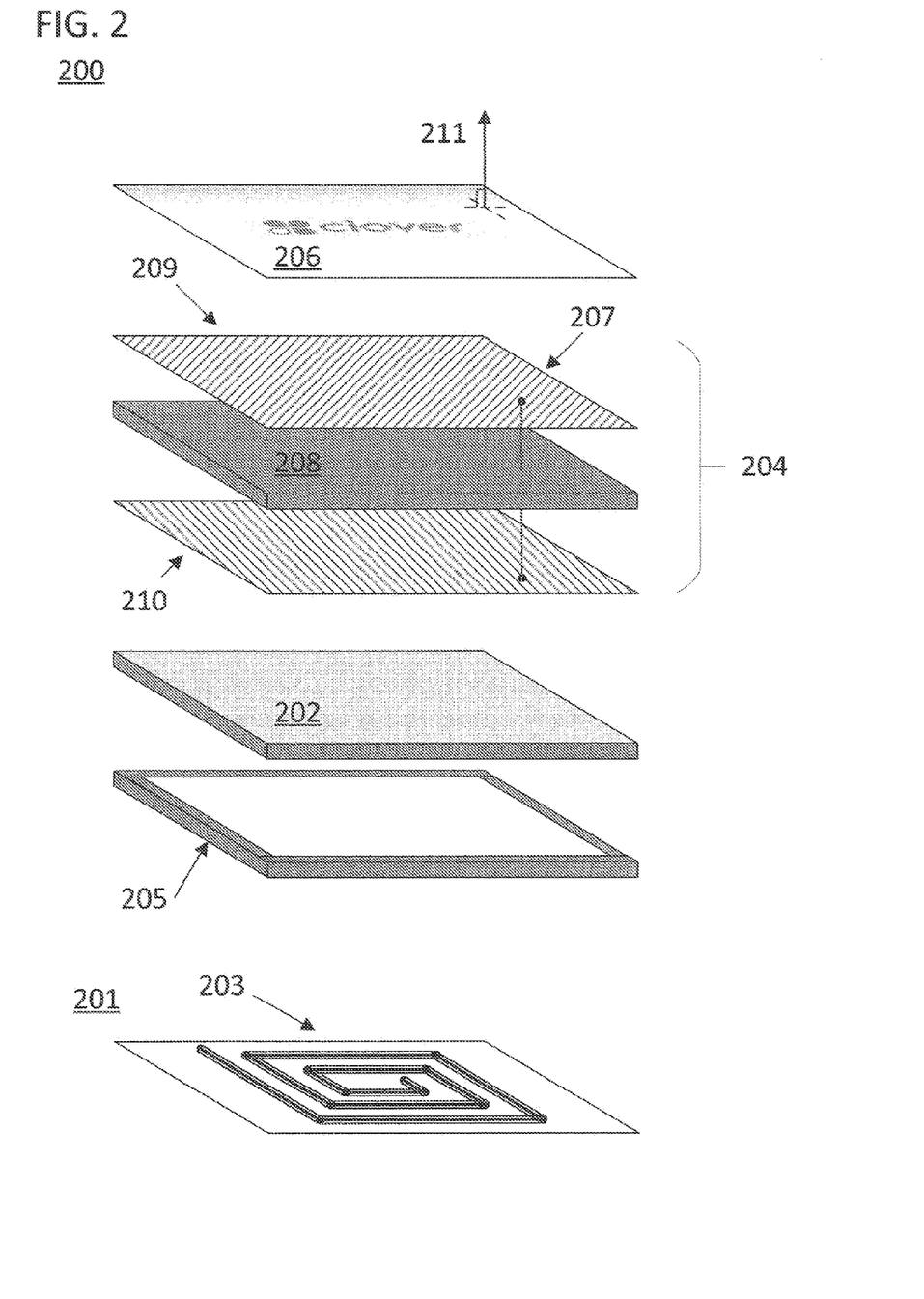
FIG. 2 is an exploded view of a touch display covering an NFC antenna that is in accordance with embodiments of the present invention.

FIG. 2 illustrates an embodiment of a touch display 200 and an NFC antenna 201 where the antenna is entirely located within a lateral extent of display 202. The antenna 201 can be an NFC antenna. As illustrated, NFC antenna 201 includes a coiled inductor 203 as its main element. The main elements of touch display 202 are display 202 itself and touch stack 204.

Display 202 can be a liquid crystal display (LCD). The LCD may include an LCD cell, top and bottom polarizers, a light guide, and a back light. Display 202 can be supported by a frame 205. The frame can be a chassis that extends around the boarder of display 202. The frame can be plastic. Frame 205 can interlock, rest upon, or be attached to a support structure of the device in which display 202 operates. For example, a support structure comprising two or more supporting notches could extend along a long edge of frame 205 while two single supporting notches, one on each end, could extend along the short edges of frame 205. Alternative support structures could also suffice such as a solid lip of material extending around the entire frame. As illustrated, frame 205 is a single uniform rectangular frame around an outline of display 202. However, the frame could also involve chevron or cross hatched support structures crossing from one side of the display to the other. The frame could also involve a grid of supports crossing from one side of the display to the other in parallel to the edges of the frame. If the right material is used, and the thickness was sufficiently limited, the frame could also be replaced by a solid plate. However, certain benefits accrue to approaches in which a frame is used instead of a solid sheet of material as will be described below. Frame 205 can also function to hold and align the various components of the display stack such as the polarizers, LCD glass, light guide, diffuser, and reflector in place during handling and manufacturing.

Touch display 200 includes touch stack 204 and transparent cover layer 206. Transparent cover layer 206 has an exposed surface for receiving touch data from a user. The surface is exposed in that it faces outward from the device. In some applications, the exposed surface may be subsequently covered by a disposable protective cover layer or some other post-sale protective layer through which touch data is received. Touch display 200 can receive touch inputs from a user via touches with a finger or stylus on, or in close proximity to, the exposed surface. The touch display can be capacitive, optical, or any kind of touch sensitive technology. However, as illustrated touch display 200 is a capacitive touch display. Touch stack 204 can be applied to the top of the display using lamination. The transparent cover layer 206 can be a scratch resistant layer configured to protect touch stack 204. Touch display 200 may include additional layers and circuitry that have been omitted to simplify the illustration. As illustrated, touch stack 204 can cover display 202, and display 202 can cover the NFC antenna 201.

As mentioned, touch display 200 is illustrated as a capacitive touch display. In such a situation, touch stack 204 can include an array of capacitive touch detection points and a transparent dielectric layer 208. The array can be an array of indium tin oxide conductors, or other transparent conductors, separated by a transparent dielectric layer 208. The transparent dielectric layer 208 could be glass or sapphire. Each capacitive touch detection point in the array of capacitive touch detection points, such as touch detection point 207, can be defined by a cross over point between a transmission line and a receiving line that are separated by transparent dielectric layer 208. As illustrated, the transmission lines 209 and receiving lines 210 of the touch stack 204 are in a crisscross pattern across display 204 and provide a uniform pattern of touch detection points across the full extent of display 204. However, any pattern that distributes capacitive touch detection points across the display can be used in its place. Raw data for detecting touches can be detected by forcing a signal onto the transmission lines 209 and detecting changes in the stored capacitance of each capacitive touch detection point via the receiving lines 210.

As illustrated, the NFC antenna 201 is located entirely within the lateral extent of display 202. However, it is also possible for NFC antenna 201 to straddle a border of the display such that it is only partially located within a lateral extent of the display. The term lateral is used here with reference to the expanse of a plane that is normal to the direction from which the images of the display are intended to be viewed. This direction is marked 211 in FIG. 2. Placing NFC antenna 201 within the lateral extent of display 202 introduces the potential for interference via shielding of the magnetic field on the communication pathway between NFC antenna 201 and the devices with which it will communicate. Modifications to display 202 and touch stack 204 can alleviate this shielding affect and facilitate communication up and out through the face of the device in direction 211.

Touch display 200 is configured to facilitate NFC communication directly through the display. In related touch displays, a metal back plate is placed in-between display 202 and the underlying components of the device to which display 202 is a part. This metal back plate provides support to display 202 and shields the display from interference caused by the components of the main board that lie below display 202. Related touch displays also generally include a conductive ground plane between touch stack 204 and display 202 that shields the touch screen from interference caused by both the main board components and the display 202. However, touch display 200 of the present disclosure does not include either a metal back plate for display 202 or a ground plane for touch stack 204. As such, there are no solid planes of conductive material that span the diagonal dimension of touch display 200 that are located between the NFC antenna 201 and the transparent cover layer 206. In addition, there is no ground plane in touch stack 204.

Touch display 200 is more conducive to communication up from NFC antenna 201 and out through the exposed surface of the display in direction 211 than a standard touch display. However, as this communication pathway has been cleared to allow for unimpeded electromagnetic signal transmission, it has also been cleared to allow for noise to move from the main boards of the device to display 202 and touch stack 204, and from display 202 to touch stack 204. Despite the introduction of this additional noise, the display can still provide a crisp noise-free image and accurate touch response to a user by making certain changes to the touch controller as described below. In addition, the lack of a metal plate behind display 202 can weaken the display and can lead to bubbles or tracks appearing in the display when it receives pressure from the exposed surface of transparent cover layer 206. However, touch display 200 can still provide adequate structural support to display 202 via the use of frame 205. Plastic frames provide adequate support to display 202 while at the same time keep the overall display more conductive to the transmission of electromagnetic signals by not weakening the magnetic field and detuning the NFC antenna. To provide this benefit, frame 205 can be plastic (e.g., ABS, PP, PA, PMMA, PC, PC/ABS, silicone, or TPU), rubber, composites, fabric, woven fiberglass, or other non-ferromagnetic or non-metallic materials.

Figure 3:
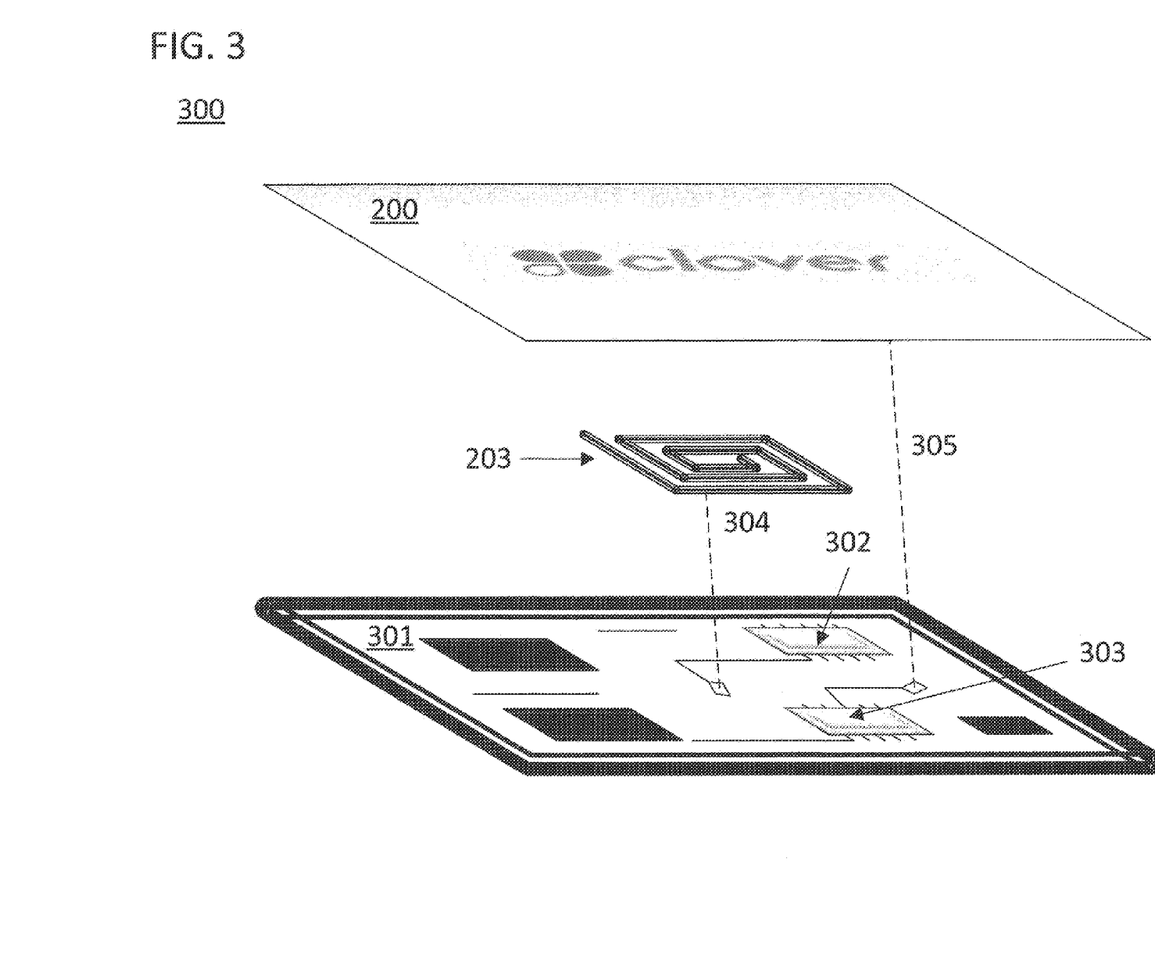
FIG. 3 is an exploded view of a device providing NFC and touch display functionality using a touch controller and an NFC controller that is in accordance with embodiments of the present invention.

As shown in FIG. 3, touch display 200 can be part of a device such as a smartphone, tablet, or POS terminal 300. Device 300 includes a main board 301 that includes the various integrated circuits (ICs) and circuit elements needed to provide the functionality of device 300. In particular, main board 301 can include an antenna controller 302 and touch controller 303. Antenna controller 302 can be an NFC antenna controller. These devices can be purchased as discrete ICs from various vendors and incorporated in a printed circuit board. However, the devices could alternatively be implemented on a combined IC or in software instructions used in combination with a general processor. As illustrated, antenna controller 302 is communicatively coupled to the NFC antenna 203 via at least one control line 304, and touch controller 303 is communicatively coupled to the touch display 200 via at least one control line 305. Touch controller 303 can include various settings to calibrate and control the behavior of touch display 200.

If touch display 200 is a capacitive touch display, control line 305 can include a pathway for all of the capacitance measurements obtained via the operation of the transmission and reception lines in the touch stack such that the touch controller is communicatively coupled to. This information can be referred to as the touch data of the touch display. Touch controller 303 can receive mutual and self-capacitance values from particular touch detection points in the capacitive touch display and process these measurements using various algorithms to distinguish an actual touch from other stimuli that may alter the active capacitance values of touch display 200.

Touch controller 303 can be modified to accommodate the increased noise to which the touch stack of 200 is exposed due to the absence of any solid planes between main board 301 and the display surface of device 300. For example, if touch display 200 is a capacitive touch display, touch controller 303 can set a range of acceptable baselines for the touch data. The baseline of the touch data is the mean of the active capacitance values that are received by the touch controller. The range of acceptable values can be implemented as hardware or firmware in touch controller 303. With the ground plane and metal back plates omitted from the touch display and NFC antenna, the range of acceptable baselines that should be used becomes much broader because of the increased exposure of the touch stack to noise from RF antenna 203, the display itself, and the components of main board 301. With all held equal, removal of the metal back plate and ground plane can require anywhere from a 25-125% increase in the range of acceptable base line values.

A second example of how touch controller 303 can be modified to accommodate the increased noise to which touch stack 200 is exposed is implementing a filter in the touch controller to tune out the additional noise that masks the active capacitance values. This filter can be implemented in the software or firmware of the touch controller. To select values for this filter, a maximum noise level can be determined by activating the NFC antenna, rendering a checkerboard pattern on the display, and switching each pixel from white to black in a sweep across the screen. Once this noise level has been determined, the minimum degree of filtering necessary to counteract this noise level can be implemented in the touch controller of additional devices produced using the same specifications.

Figure 4:
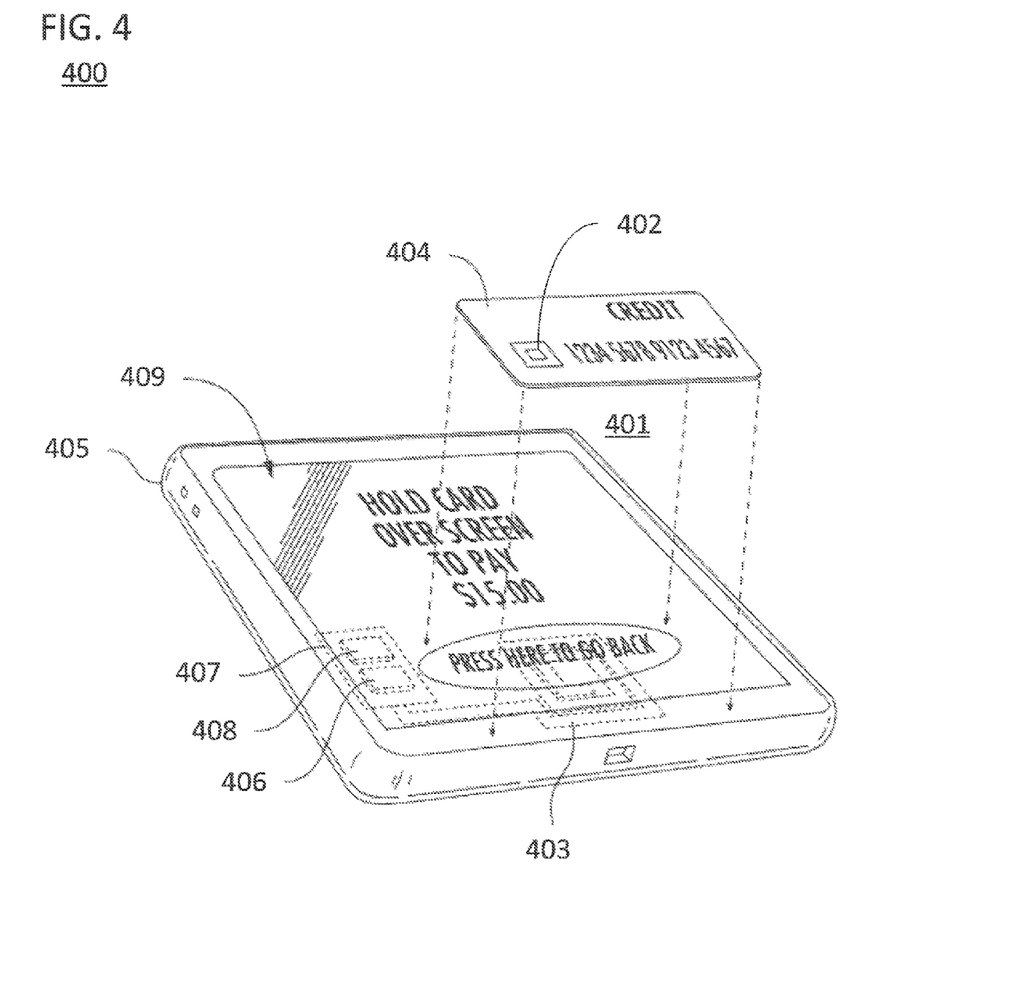
FIG. 4 is a system engaging in NFC communication through a touch display in accordance with embodiments of the present invention.

FIG. 4 illustrates an exemplary system 400 that includes a communication path 401 illustrated by dotted lines and which extends between an external NFC antenna 402 and an internal NFC antenna 403. In the illustrative system, the external antenna is a proximity integrated circuit chip (PICC) located in a smart card 404 and the internal antenna is located in the proximity inductive coupling device (PCD) transceiver 405. As illustrated, the PCD is a POS terminal 405 and the PICC is being used to conduct a closed loop communication session with the PCD in accordance with a pre-specified communications protocol for the exchange of information along communication path 401. The information is used to process a payment transaction between the user of the PCD and PICC. The communication session can be administrated by an antenna controller 406 located on a printed circuit board 407 within the body of the device. Additional components such as a touch controller 408 may be located on board 407 with the antenna controller.

The PCD can include a touch display 409 which may be a capacitive touch display such as touch display 200 in FIG. 2 and may also have a diagonal dimension of at least 5 inches. Likewise, the internal NFC antenna 403 can be the NFC antenna 201 of FIG. 2. As such, communication path 401 can be intersected by a capacitive touch display. Although a payment system is illustrated, system 400 can be generalized as disclosed to achieve operative communication between any external NFC antenna and internal NFC antenna through a capacitive touch display. If touch display 200 is utilized, reliable communication can still be achieved in the system because the electromagnetic interference of touch display 200 is lower than that of related approaches. In other words, touch display 200 exhibits a lower electromagnetic dissipation factor when compared to prior devices. Indeed, in the absence of a ground plane for touch stack 204, and a metal support plane for display 202, the combined electromagnetic dissipation factor for the transparent cover layer, touch stack, and display can be lower than for a standard touch display. As a result, and with particular reference to FIG. 4, if touch display 409 is implemented in keeping with the approaches discussed above with respect to touch display 200, then display 202 alone could be the most prominent contributor to the electromagnetic dissipation factor of communication path 401. If the system were being utilized in a standard household air environment, the electromagnetic dissipation factor of communication path 401 could be low enough to generate a magnetic field capable of inducing a DC voltage of greater than 2.55V in a contactless analog test card at a distance of 4 cm from the face of display 409 with an input of 2 W to NFC antenna 403. The contactless analog test card can be an EMVCo analog test card.

Dynamic Detection of NFC Antenna Status

Specific methods and devices for dynamically detecting the state of the NFC antenna are described below with reference to FIGS. 3 and 5-6. Certain advantages accrue to approaches in which the effect of the NFC antenna on the touch display of a device such as device 300 can be mitigated. As part of this objective, it is helpful for the touch controller of the touch display to find out when the NFC antenna is in an activated or deactivated state. In other words, the touch and antenna subsystems can avoid interfering with each other if each subsystem has a certain degree of information regarding the current behavior of its counterpart system.

With reference to FIG. 3, one approach for having inter-related awareness between the two subsystems would be to have a line on main board 301 between touch controller 303 and antenna controller 302. For example, either controller 302 or 303 could be connected via a digital communication interface to any sort of computational intelligence in device 300 that could provide an indication that the NFC antenna was active. Two more specific examples include: the controllers each being augmented with a digital communication interface, such as a GPIO pin, in order to exchange digital data regarding their respective modes to each other; or the touch controller being augmented with a digital communication interface to receive data indicating that the RF antenna has been activated. Although these approaches accomplish the objective of enabling the touch and/or antenna controller to keep track of the state of its counterpart system, they all require modifications to the controllers to enable them to receive the required data. If the controllers were implemented purely in software, these modifications would be easy to implement. However, benefits accrue to situations in which the design for device 300 can operate with any given touch controller IC without the need to modify the hardware of that IC. Such benefits include those associated with designs having greater portability and modularity. As such, it would be beneficial for a touch controller IC to be able to detect the state of a counterpart NFC subsystem without modifications to the hardware of the device.

Figure 5:
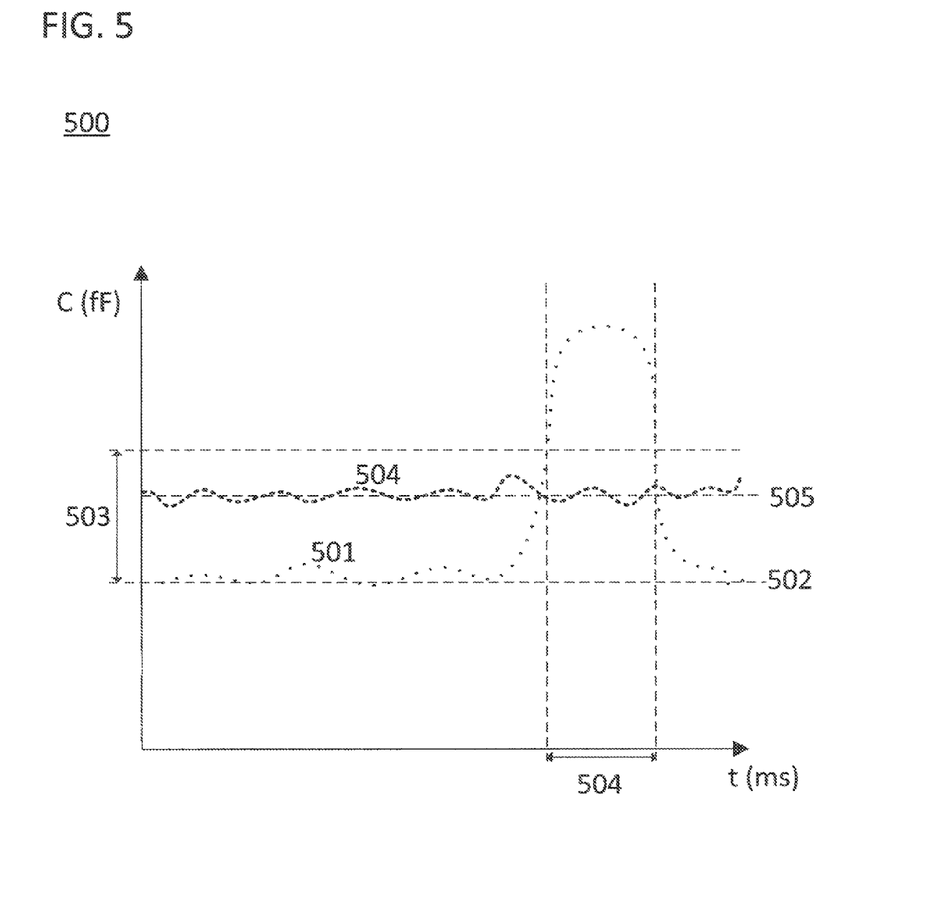
FIG. 5 is a plot of time against active capacitance values from a touch display that is in accordance with embodiments of the present invention.
Figure 6:
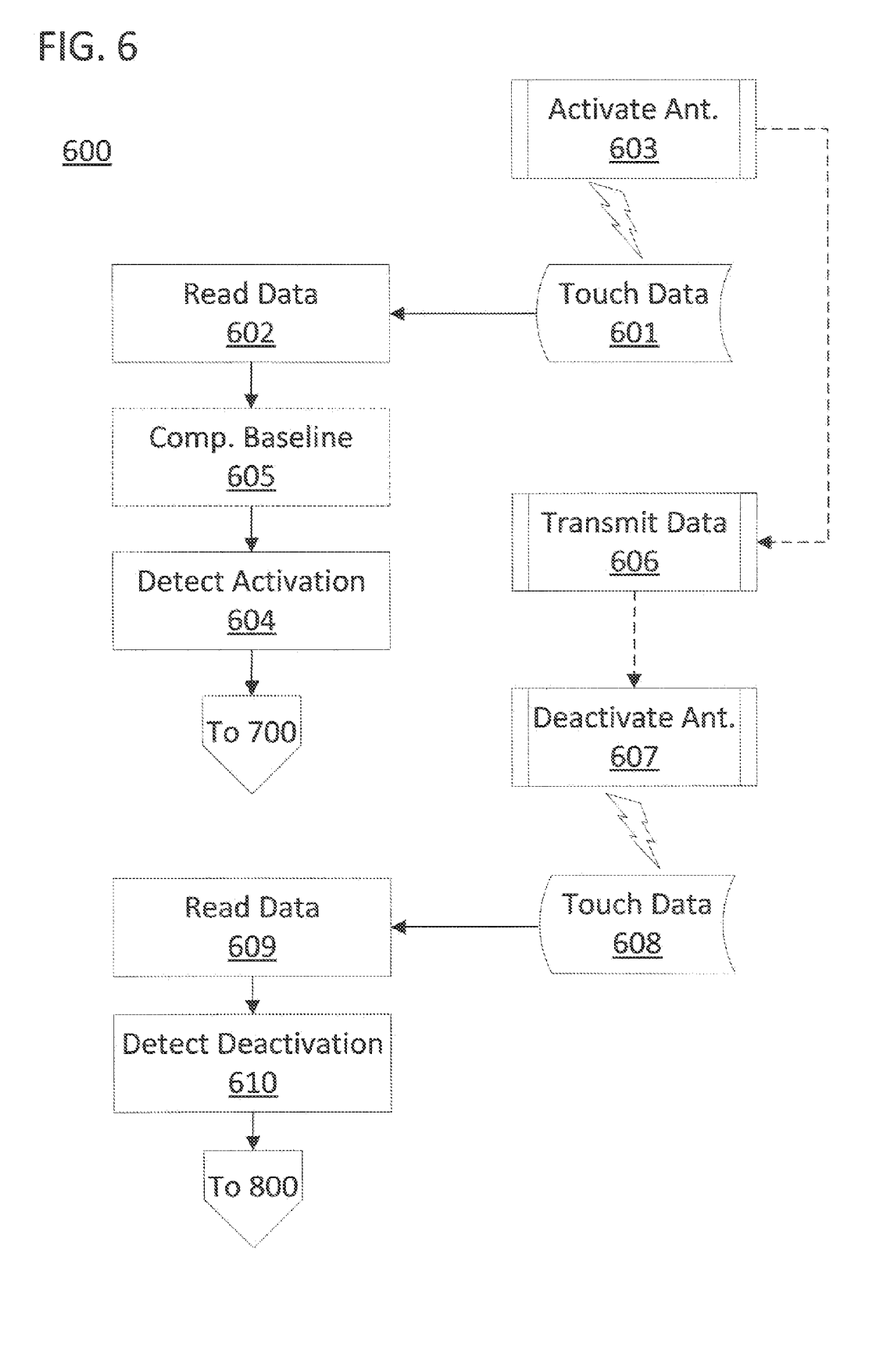
FIG. 6 is a flow chart of methods for detecting the state of an NFC antenna using a touch display that are in accordance with embodiments of the present invention.

FIG. 5 illustrates a plot wherein the abscissa is in units of time in milliseconds and the ordinate is in units of capacitance in femto farads. Plot 500 includes a first stream of raw active capacitance values 501 received by the touch controller. The values are a stream of raw active capacitance values received from a capacitive touch detection point in a capacitive touch array as received by a touch controller. Stream 501 is analyzed by the touch controller with reference to a baseline 502. Touches are detected when the values in the stream exceed a threshold 503 above baseline 502. Baseline 502 is periodically updated by the touch controller to reflect the mean of the active capacitance values that are received by the touch controller. As illustrated, a touch may be detected around time span 504, but additional processing will be conducted to determine the centroid of the touch and whether it is an actual touch or some other disturbance. First stream 501 is generated when the NFC antenna is not activated. Plot 500 also includes a second stream of raw active capacitance values 504 received by the touch controller. However, this second stream of values 504 is generated when the NFC antenna is activated. When the RF antenna is activated, the interference from the generation of an electromagnetic field in close proximity to the capacitive touch detection point represented by chart 500 will cause a change in the mean value of the active capacitance values received by the touch controller from that capacitive touch detection point. As a result, the touch controller will automatically calculate a new baseline 505 when the NFC antenna is activated.

The touch controller can be modified to utilize the information that this shift in the baseline, or any other change in state of the touch array, provides. In other words, for the same reason that the NFC antenna disturbs the behavior of the touch display, the touch display is able to provide a channel by which the touch controller may detect when the NFC antenna is activated or deactivated. Also, in contrast to approaches in which the hardware of a touch controller IC needs to be modified in order to be able to determine the status of the RF antenna, detecting the state of the RF antenna via the touch display itself only requires modifications to the firmware or software of the touch controller. As commercially available touch controllers often include customizable firmware for consumer modification, this functionality can be implemented in a standard off-the-shelf touch controller. Regardless of what form the touch controller takes, a comparator can be instantiated in the touch controller to compare a current baseline of the array of capacitive touch detection points to a trigger level and the trigger level can be stored in the touch controller. In certain approaches, the trigger level will be higher than a noise floor baseline of the array of capacitive touch detection points when the NFC antenna is not activated.

A method for dynamically detecting the state of an NFC antenna that is communicating through a touch screen display can be described with reference to flow chart 600 in FIG. 6. The methods of FIG. 6 can be conducted using a processor. The method can be conducted by a device such as device 300 with a touch display such as touch display 201 and the processor can be on main board 301. Certain steps in flow chart 600 can be conducted by the touch controller as indicated below. Instructions for conducting those steps can be stored in a memory that is accessible to the processor. If the touch controller is implemented in an integrated circuit, instructions for conducting those steps can be stored in firmware or hardware on the touch controller.

Flow chart 600 includes input data 601 which represent a stream of touch values from the capacitive touch array. Flow chart 600 also includes process 602 in which the touch data is read using the touch controller. This step 602 can involve conducting the values through the pins of a packaged integrated circuit and storing the values in registers. Process 602 can also include measuring the touch values using a processor of the touch controller. Process 602 can also involve moving the data up through the OSI model from the PHY level and storing the read values in a format that is accessible to a higher layer of the model for further processing. Device 300 can conduct step 602 continuously to receive and process touch data from the touch display in the ordinary course of operation.

Flow chart 600 also includes step 603 in which the NFC antenna 203 is activated and processes by which that activation can be detected by the touch controller. This step is conducted by a separate system which can be an antenna controller such as antenna controller 302. The step can involve the generation of a time varying voltage or current signal and the application of that signal to the antenna. As shown in flow chart 600, the activation of the antenna can have an effect on touch data 601. As a result, when touch data 601 is read in step 602, the process can continue with detecting activation of the NFC antenna using the touch data as in step 604. Activation can be detected in step 604 using any measurement received from the capacitive touch screen 200. In particular, the measurement can be a current baseline of the stream of touch values in touch data 601. To this end, flow chart 600 exhibits alternative step 605 in which a comparison is made between a trigger level baseline and a current baseline of the stream of touch values. Step 605 can also involve the generation of a comparison which can serve as the measurement for step 604. Steps 602, 605, and 604 can all be conducted by the touch controller.

Flow chart 600 also includes step 606 in which the NFC antenna 203 is used to transfer data through capacitive touch screen 200, step 607 in which the antenna is deactivated, and processes by which that deactivation can be detected by the touch controller. The data transmitted in step 606 can be transferred to an external inductive antenna such as external antenna 402 in FIG. 4. The lines to step 606 are drawn in phantom because the step can be conducted at any time which respect to steps 602 to 604. However, certain benefits accrue to steps in which activation of the RF antenna can be detected prior to the actual transmission of data as will be described later. Steps 606 and 607 can be conducted by a separate system which can be an antenna controller such as antenna controller 302. Step 607 can involve the cessation of modulation on a time varying signal being applied to the antenna and the return of the potential of the inductive antenna to a set bias voltage such as ground. As shown in flow chart 600, the deactivation of the antenna can have an effect on a second stream of touch data 608. As a result, when touch data 608 is read in step 609, the process can continue with detecting deactivation of the NFC antenna using the touch data as in step 610. Steps 609 and 610 can be conducted roughly in accordance with steps 602 and 604 respectively. Step 610 can be conducted using a measurement from the capacitive touch detection points in the capacitive touch display. Steps 609 and 610 can both be conducted by the touch controller.

Touch Controller Reacalibration and Alternative Modes

Figure 7:
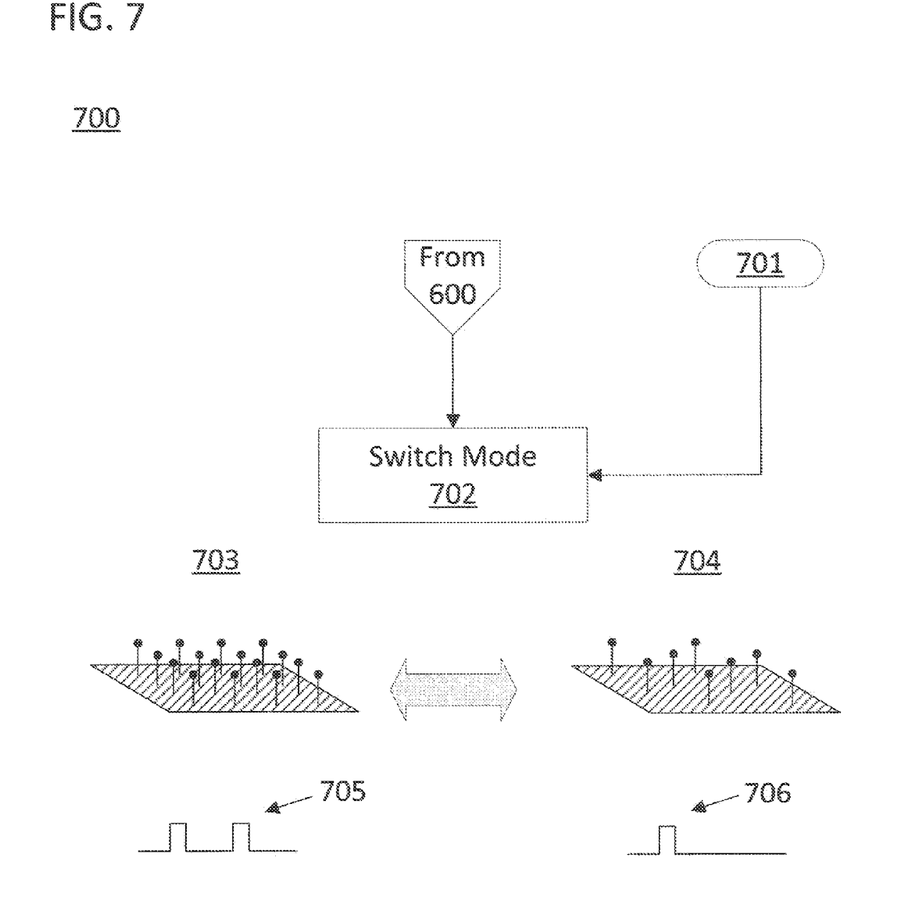
FIG. 7 is a flow chart and diagram illustrating methods for switching the modes of a touch display that are in accordance with embodiments of the present invention.
Figure 8:
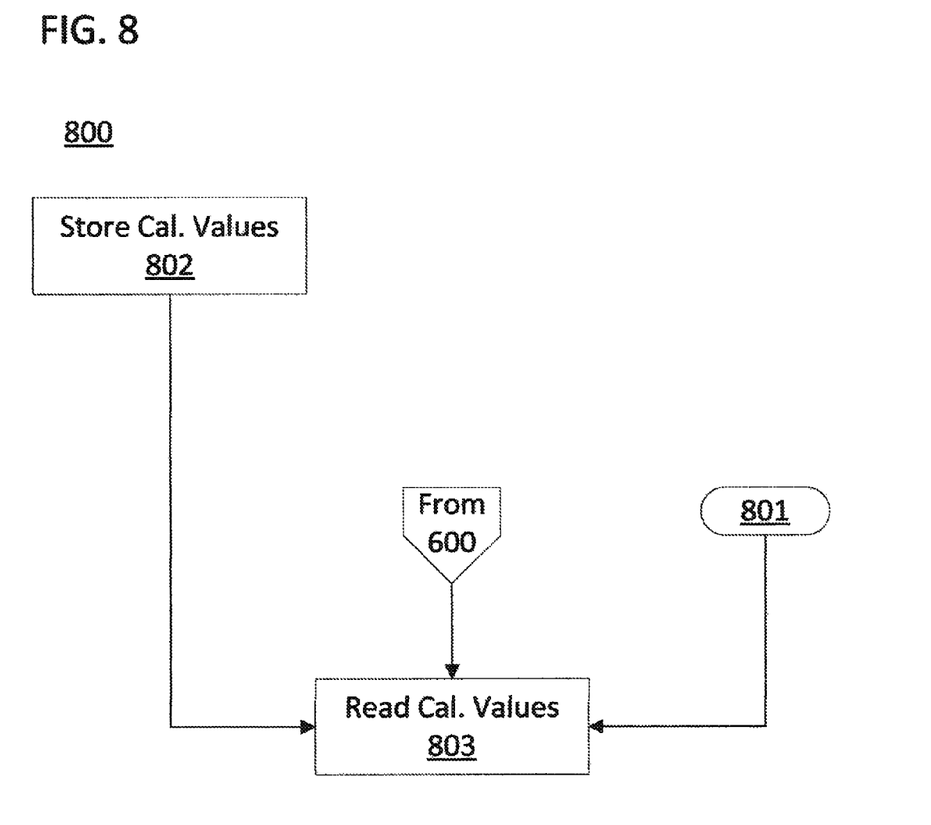
FIG. 8 is a flow chart illustrating methods for conducting a partial recalibration of a touch display that are in accordance with embodiments of the present invention.
Figure 9:
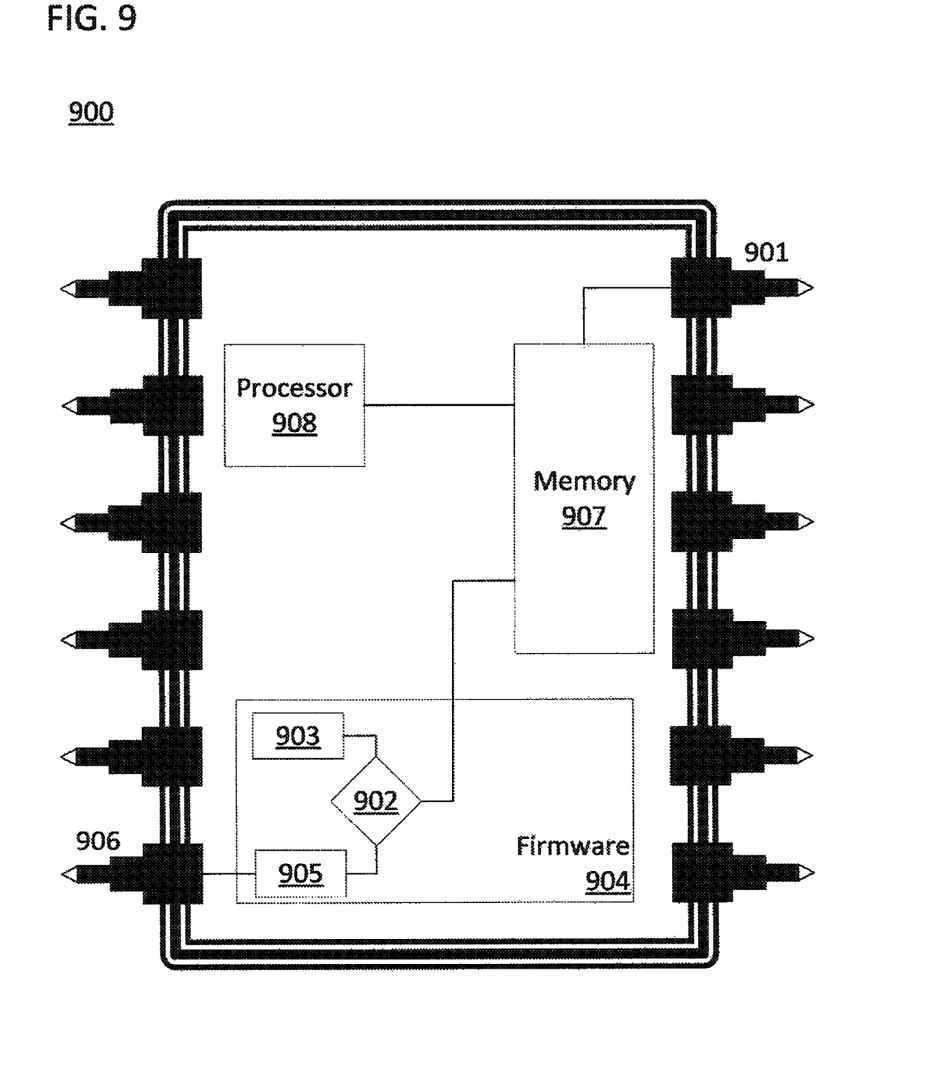
FIG. 9 is a block diagram of a touch controller that is in accordance with embodiments of the present invention.

FIG. 7-8 illustrate methods that can be executed by a touch controller, such as touch controller 305 in device 300, to mitigate the effect of NFC antenna 203 on the functionality of touch display 200. FIG. 9 illustrates a touch controller 900 that is capable of conducting the methods illustrated by FIGS. 7-8 as well as those illustrated by FIG. 6. Touch controller 900 can take the place of touch controller 303 in device 300. The methods involve certain measures that can be taken by a touch controller, such as touch controller 303, to mitigate the effect of antenna 203 on touch display 200. However, these methods also involve specific precautions that are taken to assure that the responsiveness of the touch screen is not concomitantly degraded. A device such as device 300 should be able to provide nearly the same touch experience via touch display 200 regardless of whether antenna 203 is activated or deactivated, and furthermore, any modification to the touch display required at the actual moment of activation or deactivation of the NFC antenna should take place rapidly so that a user of the device does not experience a loss of functionality as the display adjusts itself.

FIG. 7 is a flow chart 700 that illustrates a set of methods that can be conducted by a touch controller such as touch controller 303 in device 300. These methods allow the touch controller 303 to react to the state of an associated NFC antenna such as NFC antenna 203. Flow chart 700 commences from an off page reference to FIG. 6 where activation of the NFC antenna was detected by the touch controller. However, flow chart 700 includes an additional alternative start point 701 in which the touch controller 303 is provided with information concerning the status of an associated NFC antenna via alternative means such as a digital communication pathway. The digital communication pathway can involve a pin on the touch controller if the touch controller is implemented as an IC such as touch controller 900 (FIG. 9). As illustrated, the pin can be a GPIO pin such as GPIO pin 901. In this case, touch controller 900 detects activation of the NFC antenna by receiving a signal that indicates this fact from an external system.

Regardless of which start point is used to access flow chart 700, the flow chart continues with step 702 in which the touch controller is switched from an antenna-deactivated mode to an antenna-activated mode based upon detecting activation of the NFC antenna. This step can also be conducted to shift the antenna back from the antenna-activated to the antenna-deactivated mode. In this manner, the touch controller is able to adapt the touch display to perform optimally under the operating conditions created by the activation or deactivation of the NFC antenna, which thereby enables the touch controller to assure that the overall user experience produced by a combined NFC antenna and touch display is optimized.

The touch controller can switch the touch display between a plurality of modes. In certain approaches, the touch display will just exhibit two alternative modes: one for when the NFC antenna is activated and one for when the NFC antenna is deactivated. However, in other approaches the touch display will exhibit several different modes of operation based on the action of the NFC antenna. These alternative modes may be placed on a continuum having a span defined by the degree of interference created by the NFC antenna (i.e., one end of the continuum comprises an operational mode in which the most electromotive force is being induced in the antenna). The modes can differ in terms of the report rates of the touch array, number of scan points in the touch array, and the degree to which additional filtering and computation on the touch data is implemented. Generally, the modes will differ with respect to at least two of these factors. The additional filtering can be conducted by software filters implemented in the firmware of a touch controller IC.

FIG. 7 includes a depiction of two operational modes for the touch display. As illustrated, mode 703 has a higher number of scan points in the touch array and a higher report rate 705 than mode 704. The report rate can also be referred to as the touch array sampling rate and refers to how often a measurement is taken from individual touch points in the touch array. The scan rate 706 and number of scan points in mode 704 are half that of mode 703, in this embodiment. As illustrated, mode 703 is an exemplary antenna deactivated mode and mode 704 is an exemplary antenna activated mode. Modes 703 and 704 also differ in terms of the degree of additional filtering applied to the touch data, where mode 704 undergoes a greater degree of filtering than mode 703. Additional filtering on the touch data makes the touch data much less sensitive to noise from the NFC antenna. However, additional filtering and computation by the touch controller also slows down the responsiveness of the touch display, and at a certain point the user experience will degrade as the processing of touch data will not line up with a user's expectation of when that processing should be complete. However, reducing the report rate and number of scan points counteracts the action of this additional filtering and computation. Since there is less touch data produced (less than a quarter as much in the case of half the scan points scanning at half the frequency of the alternative mode) the performance of the touch display may not decrease appreciably in terms of latency and responsiveness even though additional filtering and computation have been implemented. Therefore, placing the touch display in this alternative mode preserves both the accuracy and responsiveness of the touch display even when the associated NFC antenna is activated.

As the alternative mode switching of step 702 preserves the characteristics of the touch display while the NFC antenna is activated, certain benefits accrue to approaches in which step 604 is conducted prior to step 606. When the NFC antenna is actually transmitting data, the interference it creates within the touch display is even greater than when the antenna is merely activated. In certain approaches, the execution of steps 604, and alternate step 605, are conducted as quickly as possible and in real time with step 602. In other approaches, data is read in step 602 from a collection of points from the touch array, and additional processing in steps 605 and 604 is conducted using batch processing. However, the processing in steps 605 and 604 is still done in close temporal proximity to the execution of step 602.

In order to efficiently execute alternate step 605, a touch controller, such as touch controller 900, can include an instantiated comparator 902 that is used to compare a current baseline of the array of touch detection points to a trigger level. The trigger level can be stored in a memory 903 that is accessible to comparator 902. Memory 903 can be non-volatile or volatile memory into which the trigger level is loaded during initialization of touch controller 900. Memory 903 can also be burned into firmware 904 of touch controller 900. The trigger level can also be stored in memory 907 as a configuration value which is provided to firmware 904 after the device is powered on and initialized. Comparator 902 can be instantiated in hardware or software, and in an exemplary embodiment will be instantiated in firmware such as firmware 904 of touch controller 900. Comparator 902 is shown comparing a baseline value delivered through the use of signal processor 905 operating on touch data received on pin 906. Signal processor 905 can include an analog to digital converter and may also include a filter. The comparison conducted by comparator 902 can be conducted very rapidly. In certain approaches, the comparator will be able to report back to the processor that the NFC antenna is activated before the antenna is used to actually transmit data. The output of the comparison can be stored in memory 907 as a flag value to indicate the statue of the NFC antenna.

Touch controller 900 will not require the receipt of data concerning the status of the NFC antenna on pin 901 if it derives the status of the NFC antenna from touch data received on pin 906. Both connections are shown merely for illustrating both potential implementations. Regardless of which implementation is used, the touch controller will be kept in constant awareness of the status of the NFC antenna.

FIG. 8 is a flow chart 800 that illustrates a set of methods that can be conducted by a touch controller such as touch controller 303 in device 300. These methods allow the touch controller 303 to react to the state of an associated NFC antenna such as NFC antenna 203. Flow chart 800 commences from an off page reference to FIG. 6 where activation of the NFC antenna was detected by the touch controller. However, flow chart 800 includes an additional alternative start point 801 in which the touch controller 303 is provided with information concerning the status of an associated NFC antenna via alternative means such as a digital communication pathway. The digital communication pathway can involve a pin on the touch controller if the touch controller is implemented as an IC such as touch controller 900. As illustrated, the pin can be a GPIO pin such as GPIO pin 901. In this case, touch controller 900 detects activation of the NFC antenna by receiving a signal that indicates this fact from an external system.

Regardless of which start point is used to access flow chart 800, the illustrated process cannot commence without the occurrence of a prior step 802 in which a set of prior calibration values were stored in a memory when the NFC antenna was activated. Touch controllers include a variety of calibration values that are used to tune the operation of the touch display such as a noise floor baseline level, a baseline increase threshold for detecting touch, a noise filter enable flag, a touch array report rate, and a touch array touch point count. These calibration values are applied to the processor of a touch controller to guide the processing and collection of touch data from the touch display. The calibration values that are currently being used by the touch controller can be read from a memory, such as memory 907, by a processor, such as processor 908. Before the NFC antenna is activated, touch controller 300 can undergo a calibration process in which certain calibration values are selected to be stored as prior calibration values. The values can be calculated on the fly or during a specific calibration procedure implemented by the touch controller. The prior calibration values can be stored in a memory either off or on the touch controller. For example, the prior calibration values could be stored in memory 907 in a touch controller such as touch controller 900. The prior calibration values can then be written to a memory, such as memory 907, as soon as the touch controller 900 detects that the NFC antenna is activated. Alternatively, the prior calibration values can be stored and refreshed periodically without reference to when the NFC antenna is turned on, and the periodic replacement of those values can cease as soon as the NFC antenna is activated.

Once the prior calibration values have been stored, and the deactivation of the RF antenna has been detected, the methods of flow chart 800 can proceed to step 803 in which the set of prior calibration values are read by processor 908 of touch controller 900 from memory 907. This process can also involve reading the set of prior calibration values from the memory after determining that the NFC antenna has been deactivated. Generally, the sets of calibration values will differ with respect to at least two of the following factors: a noise floor baseline level, a baseline increase threshold, a noise filter enable flag, a touch array report rate, and a touch array touch point count. The prior calibration values can then be kept in the cache for rapid access by the processor. Benefits accrue to approaches in which step 803 is conducted as soon as possible after the NFC antenna is deactivated.

The approaches of flow chart 800 exhibit certain benefits in that the blind reapplication of stored prior calibration values (i.e., without using an additional recalibration process) greatly enhance the user experience offered by devices such as device 300. As there is no time taken to conduct an additional calibration process, the touch screen can return to full responsive status as soon as the values are written from cache memory to the actual processor. In certain approaches, this step can happen far more quickly than a full recalibration of the touch display. As a result, the responsiveness of the touch screen will again not be influenced by a change in the state of the NFC antenna.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although a majority of the application was directed specifically to NFC communications, the methods devices and systems disclosed above can be utilized to facilitate the communication of any inductive RF communication through a touch display. These and other modifications and variations to the present invention may be practiced by those skilled in the art, without departing from the scope of the present invention, which is more particularly set forth in the appended claims.

What is claimed is:

1. A device comprising:
a body of the device
a transparent cover layer with an exposed surface;
a touch stack covered by the transparent cover layer, wherein the touch stack includes: (i) an array of capacitive touch detection points; and (ii) a transparent dielectric;
a plastic frame;
a display with a set of components and a diagonal dimension in excess of five inches, covered by the touch stack; and
a near field communication antenna covered by the display and located entirely within the lateral extent of the display; and
a printed circuit board within the body of the device and including a touch controller and a near field communication controller;
wherein the antenna is located between the printed circuit board and the display;
wherein at least a portion of the plastic frame is covered by the display;
wherein the plastic frame supports the display;
wherein the plastic frame holds and aligns the set of components of the display;
wherein there are no solid planes of conductive material that: (i) span the diagonal dimension; and (ii) are located between the near field communication antenna and the transparent cover layer; and
wherein there is no ground plane in the touch stack.

2. The device of claim 1, wherein:
the near field communication antenna is a near field communication antenna and includes a coiled inductor;
the display is a liquid crystal display; and
each capacitive touch detection point in the array of capacitive touch detection points is defined by a cross over point between a transmission line and a receiving line separated from the transmission line by a dielectric layer.

3. The device of claim 1, further comprising:
a touch controller that is communicatively coupled to the array of capacitive touch detection points; and
a comparator instantiated in the touch controller to compare a current baseline of the array of capacitive touch detection points to a trigger level;
wherein the trigger level is stored in the touch controller and is higher than a noise floor baseline of the array of capacitive touch detection points when the near field communication antenna is not activated.

4. The device of claim 1, further comprising:
an antenna controller that is communicatively coupled to the near field communication antenna; and
a touch controller that is communicatively coupled to the antenna controller via a digital communication interface and communicatively coupled to the array of capacitive touch detection points;
wherein the touch controller receives an indication that the near field communication antenna is active via the digital communication interface.

5. The device of claim 1, further comprising:
a touch controller that is communicatively coupled to the array of capacitive touch detection points;
a memory that stores: (i) a current set of calibration values for access by a processor of the touch controller; and (ii) a set of prior calibration values;

wherein the set of prior calibration values are stored to the memory before the near field communication antenna is deactivated; and wherein the set of prior calibration values are read from the memory by the processor after the near field communication antenna is deactivated.

6. The device of claim 5, wherein the set of prior calibration values includes at least two of:
a noise floor baseline level, a baseline increase threshold, a noise filter enable flag, a touch array report rate, and a touch array touch point count.

7. A system comprising:
a device having:
a body;
a plastic frame;
an internal near field communication antenna;
a capacitive touch display having a set of components, a diagonal dimension of at least 5 inches and entirely covering the internal near field communication antenna;
a transparent cover layer covering the capacitive touch display and having an exposed surface;
a printed circuit board within the body of the device and including a touch controller and a near field communication controller;
wherein the antenna is located between the printed circuit board and the display;
wherein at least a portion of the plastic frame is covered by the display;
wherein the plastic frame supports the display;
wherein the plastic frame holds and aligns the set of components of the display; and
wherein there are no solid planes of conductive material that: (i) span the diagonal dimension; and (ii) are located between the near field communication antenna and the transparent cover layer; and
an external near field communication antenna in operative communication with the internal near field communication antenna through the capacitive touch display.

8. The system of claim 7, further comprising:
a touch stack in the capacitive touch display;
wherein there are no solid planes of conductive material that: (i) span the diagonal dimension; and (ii) are located between the internal near field communication antenna and the transparent cover layer; and
wherein there is no ground plane in the touch stack.

9. The system of claim 7, further comprising:
a plastic frame;
wherein at least a portion of the plastic frame is covered by the capacitive touch display; and
wherein the plastic frame supports the capacitive touch display.

10. The system of claim 7, further comprising:
a communication path between the external near field communication antenna and the internal near field communication antenna that is intersected by the capacitive touch display;
wherein the capacitive touch display is the most prominent contributor to an electromagnetic dissipation factor of the communication path.

11. The system of claim 7, further comprising:
a communication path between the external near field communication antenna and the internal near field communication antenna that is intersected by the capacitive touch display;
wherein the electromagnetic dissipation factor of the communication path is low enough to allow the near field communication antenna to induce a direct current voltage of greater than 2.55 Volts in a contactless analog test card at a distance of 4 Centimeters from the exposed surface with an input of 2 Watts to the near field communication antenna.

12. The system of claim 7, further comprising:
an array of capacitive touch detection points located in the capacitive touch display; and
a touch controller in operative communication with the array of capacitive touch detection points;
wherein the touch controller stores instructions to execute a method comprising:
measuring a stream of touch values received from the array of capacitive touch detection points;
determining a current baseline of the stream of touch values;
comparing the current baseline of the stream of touch values to a trigger level to produce a comparison; and
switching the touch controller from an antenna-deactivated mode to an antenna-activated mode based upon the comparison.

13. The system of claim 7, further comprising:
an array of capacitive touch detection points located in the capacitive touch display; and
a touch controller in operative communication with the array of capacitive touch detection points;
wherein the touch controller stores instructions to execute a method comprising:
detecting deactivation of the internal near field communication antenna using a measurement from the capacitive touch detection points; and
reading a stored set of calibration values from a memory of the touch controller after detecting deactivation of the internal near field communication antenna.

* * * * *